United States Patent Office 3,090,257
Patented May 21, 1963

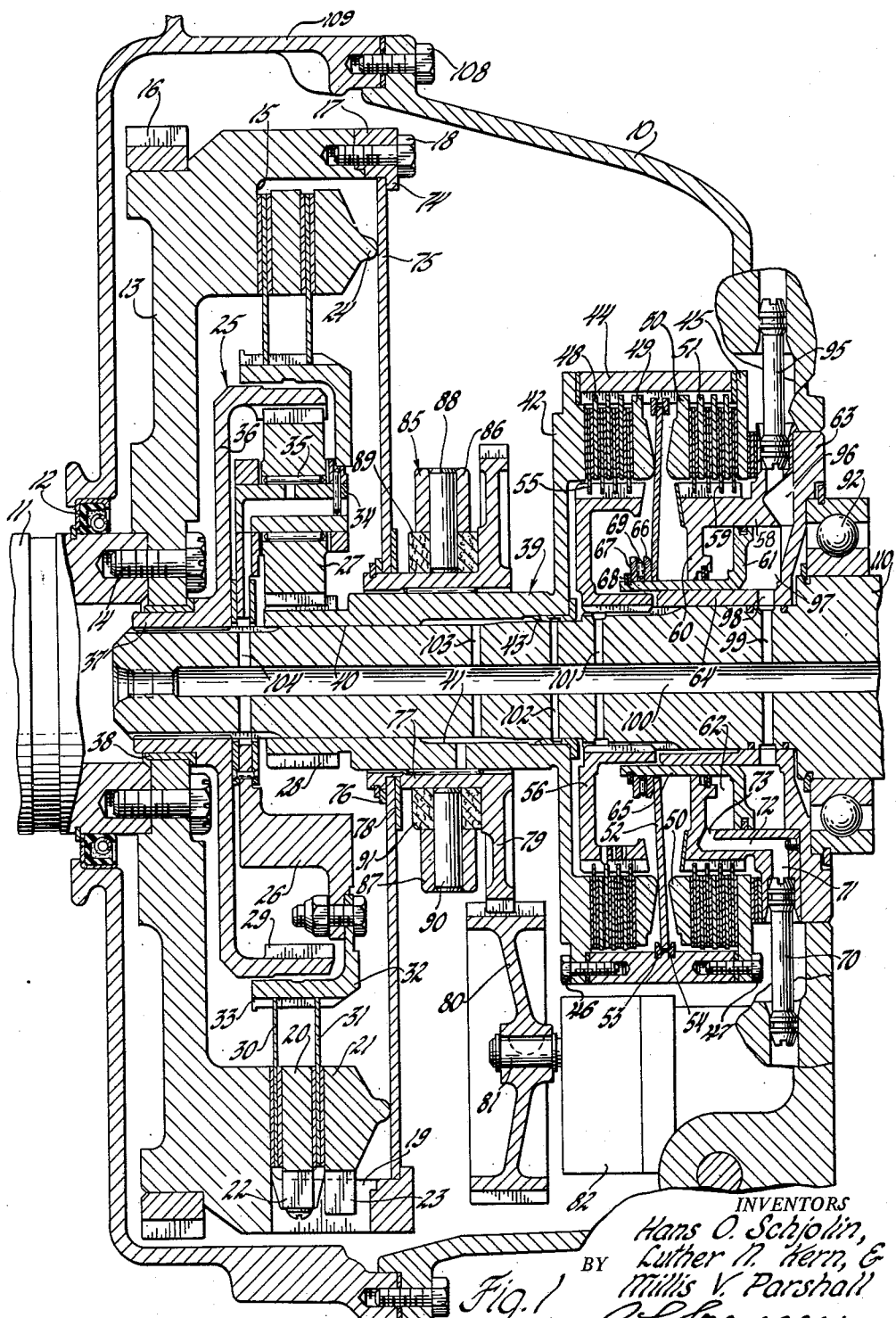

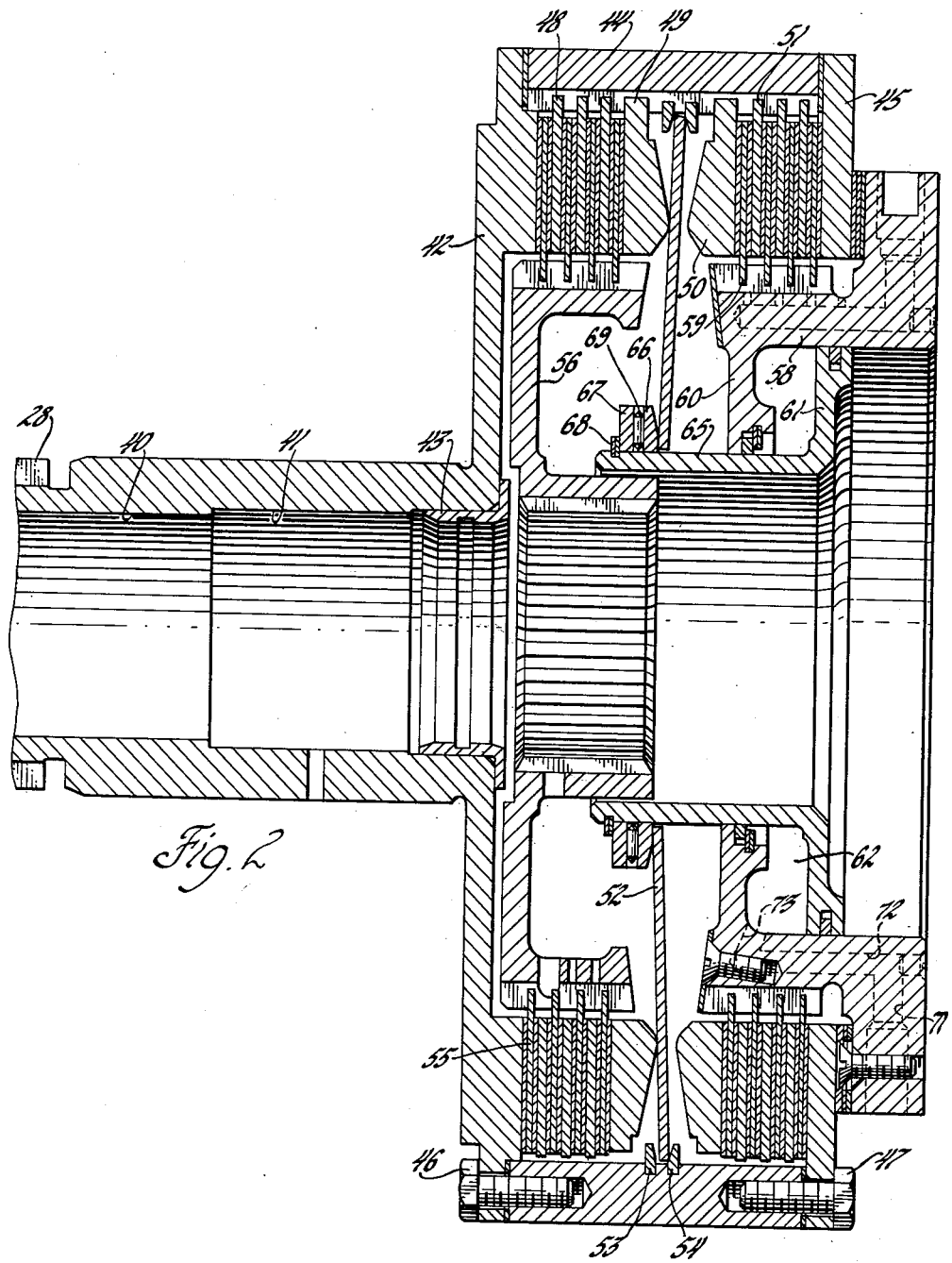

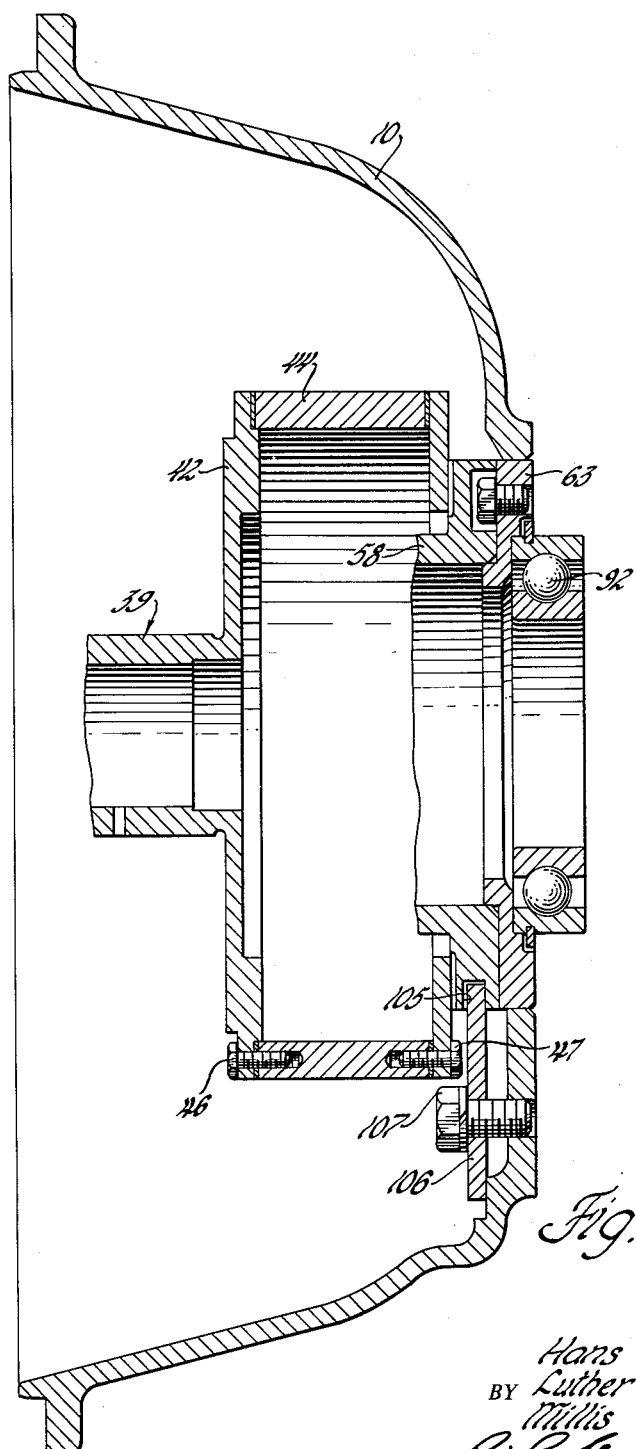

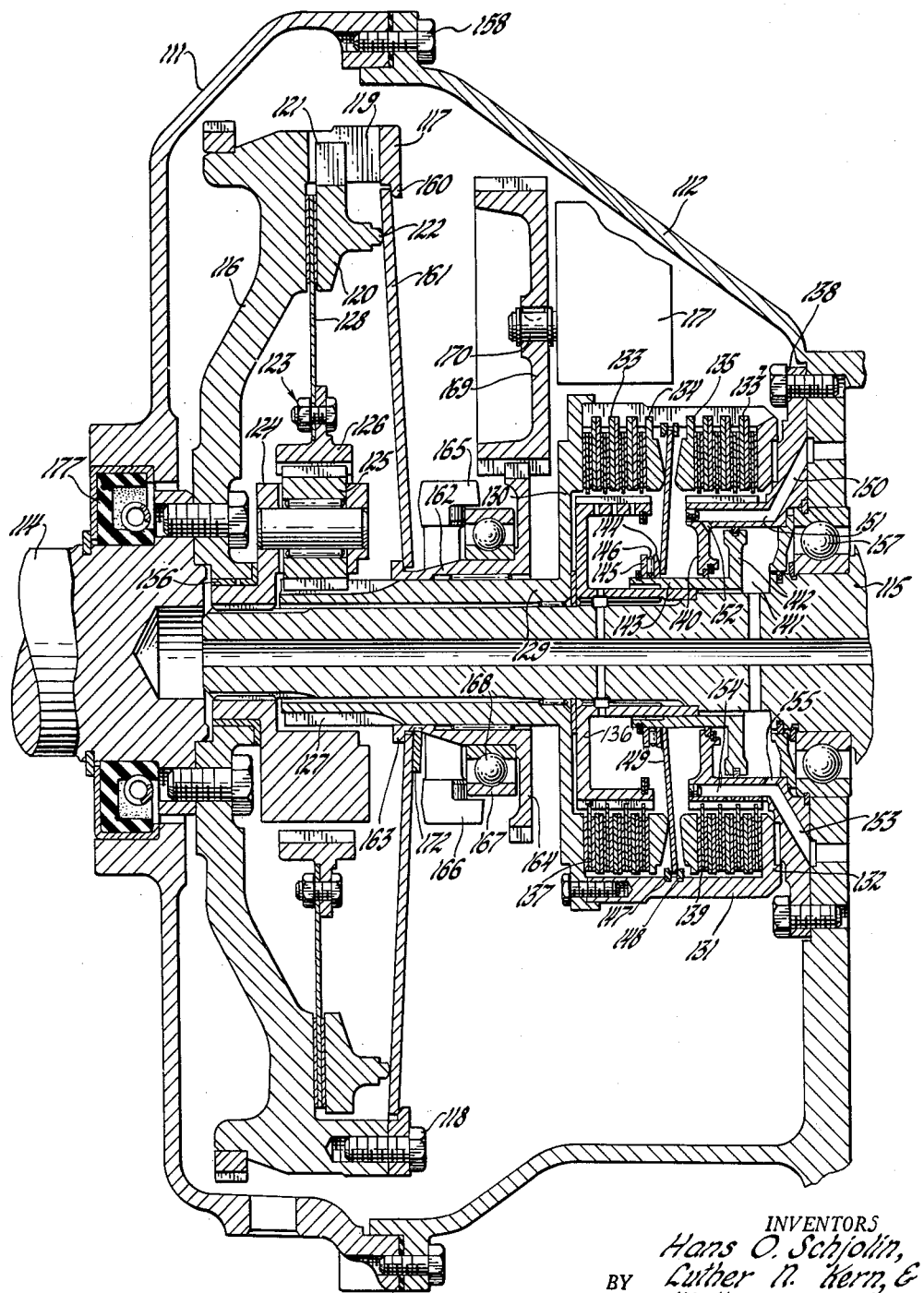

3,090,257
TRANSMISSION
Hans O. Schjolin, Birmingham, Luther N. Kern, Berkley, and Millis V. Parshall, Pontiac, Mich., assignors to General Motors Corporation, Detroit, Mich., a corporation of Delaware
Filed Nov. 21, 1960, Ser. No. 70,525
11 Claims. (Cl. 74—781)

This invention relates to transmissions and more particularly to a transmission incorporating planetary gearing and clutch and brake mechanism adapted to provide neutral plus a plurality of drive ratios.

An object of this invention is to provide a transmission incorporating planetary gearing and a neutral clutch wherein a Belleville spring is normally effective to engage the clutch to transmit drive to the gearing.

Another object of this invention is to provide a clutch and gearing arrangement of the type described wherein a Belleville spring is supported at its outer periphery on a clutch drum in such manner that the clutch drum serves as the reaction member for the Belleville spring and the spring is normally effective to engage the clutch.

A further object of this invention is to provide a mounting for a Belleville spring adapted to actuate a clutch which is of simple low cost construction.

An additional object of this invention is to provide a drive ratio control mechanism incorporating a clutch unit and a brake unit arranged in tandem wherein a single Belleville spring is utilized to actuate both units.

A particular object of this invention is to provide drive ratio control mechanism for a transmission incorporating a clutch unit and a brake unit arranged in tandem and incorporating a Belleville spring for selectively actuating said units wherein the Belleville spring is effective in and of itself to establish direct drive through the transmission.

A more particular object of this invention is to provide a drive ratio control unit for a transmission incorporating a clutch unit and a brake unit wherein a Belleville spring extends between said units at the outer periphery of the spring and wherein a single piston acting on the inner periphery of the spring is effective when supplied with fluid pressure to move the spring to release one unit and engage the other unit.

An additional object of the invention is to provide a clutch and brake unit of the class described which is specifically designed to be assembled as a subassembly and to be easily and quickly assembled into the complete transmission assembly.

These and other objects of this invention will be apparent from the following description and claims taken in conjunction with the accompanying drawings, in which:

FIGURE 1 is a transverse sectional view of one embodiment of the invention.

FIGURE 2 is a transverse sectional view of the clutch and brake assembly adapted to be preassembled as a subassembly for installation in the complete transmission assembly.

FIGURE 3 is an enlarged view illustrating the means for retaining the clutch and brake subassembly in the completed transmission.

FIGURE 4 is a transverse sectional view of a second transmission assembly incorporating the invention.

Referring to FIGURE 1 there is shown a transmission housing 10 having an engine driven power input shaft 11 extending therein through an oil seal 12. A flywheel or clutch drum 13 bolted to shaft 11 by bolts 14 provides a drive clutch surface 15. Drum 13 is provided with a ring or starter gear 16 and a reaction member 17 adapted to retain a Belleville spring 75 on the clutch drum, the retainer 17 being detachably secured to drum 13 by means of bolts 18. A series of flats 19 on drum 13 receive a clutch separator plate 20 and a presser plate 21. Slotted tangs 22 and 23 on separator plate 20 and presser plate 22, respectively engage surfaces 19 such that members 20 and 21 rotate with drum 13 but are axially slidable with respect to the drum. An annular axially extending boss 24 on presser plate is engaged by Belleville spring 75.

A planetary gearing unit 25 includes a planet carrier 26 supporting a plurality of pinion gears 27 in mesh with a sun gear 28 and a ring gear 29. Driven clutch plates 30 and 31 extend outwardly from an extension 32 of carrier 26 between drive surface 15 and separator 20 and between separator 20 and presser plate 21, respectively. A series of axially extending splines 33 on extension 32 permit axial motion of clutch plates 30 and 31 with respect to carrier 26 while at the same time cause rotation of the plates as a unit with the carrier.

Pinion gears 27 are each rotatably supported on a stub shaft 34 in carrier 26 by means of needle bearings 35. Carrier 26 is freely rotatable with respect to a power delivery shaft 110. A ring gear support 36 is splined to power delivery shaft 110 for rotation therewith, the support having an axial extension 37 splined to shaft 110. A bushing 38 supports ring gear extension 37 and one end of shaft 110 in drum 13 for rotation with respect to the drum. A sun gear assembly 39 formed integrally with sun gear 28 includes a portion 40 contacting shaft 110, a recessed portion 41 and a radially outwardly extending flange 42. A bushing 43 supports the recessed portion 41 on shaft 110 at the juncture of recessed portion 41 and flange 42. A drum 44 is bolted to flange 42 and a plate 45 is bolted to drum 44 by means of bolts 46 and 47 shown in FIGURE 2. Drive clutch plates 48 and a pressure plate 49 are splined to drum 44 for axial motion with respect to the drum. A series of discs 51 and a pressure plate 50 are splined to drum 44 for axial motion with respect to the drum. A Belleville spring 52 has its outer periphery retained on drum 44 by a pair of pivot rings 53 and 54. A clutch hub 56 splined to shaft 110 carries a series of driven clutch discs 55, the disc 55 being axially movable on hub 56 and extending radially outwardly between discs 48 and pressure plate 49. A retainer 58 has a series of discs 59 splined thereto and extending radially outwardly between discs 51 and pressure plate 50.

Retainer 58 includes a radially inwardly extending member 60 cooperating with a piston 61 to form a chamber 62 adapted to receive fluid under pressure. A housing member 63 includes an axially extending sleeve 64 contacting shaft 110 and providing a support for an annular sleeve extension 65 formed on piston 61. Sleeve 65 extends outwardly from chamber 62 at the inner end of member 60, there being a ring 66 and a washer 67 on sleeve extension 65 held on the sleeve by means of a snap ring 68. Ring 66 is rotatable on sleeve 65, there being a bearing 69 disposed intermediate ring 66 and washer 67. Belleville spring 52 is normally effective to pivot about pivot rings 53—54 to engage clutch discs 48—55. Fluid pressure may be admitted through a pipe 70, passages 71, 72 and 73 to chamber 62 to cause piston 61 to move to the right, the piston carrying the Belleville spring 52 to the right to release clutch discs 48—55 and engage friction discs 51—59, the Belleville spring acting as a lever to apply force to pressure plate 50. It will be noted that sleeve extension 64 extends to the end of clutch hub 56 beneath sleeve extension 65 of piston 61 to provide a support surface for extension 65.

Retainer 17 is provided with an inwardly extending annular rim 74 adapted to receive the outer periphery of Belleville spring 75, the inner periphery of spring 75 terminating in a retainer 76 on a clutch actuator sleeve 77.

Sleeve 77 is rotatably driven by spring 75 through a drive lug 78. A gear 79 formed integrally with sleeve 77 mates with a gear 80 on a pump drive shaft 81 such that a pump 82 is continuously driven through Belleville spring 75. The pump 82 may supply oil under pressure for actuating piston 61 through suitable control valving (not shown) and for lubrication purposes. A manually operable clutch actuator fork indicated generally at 85 includes a pair of arms 86 and 87 on the fork, the arm 86 carrying a pin 88 supporting a fiber roller 89 thereon and the arm 87 carrying a pin 90 supporting a fiber roller 91 thereon.

As shown at the right-hand end of FIGURE 1 oil for lubrication purposes may be admitted through a pipe 95, passage 96 in member 58, chamber 97, passage 98 in member 64, and passages 99, 100, 101, 102, 103 and 104 in shaft 110. Shaft 110 is supported in housing member 63 by means of a ball bearing 92.

As shown particularly in FIGURE 2, the subassembly including sun gear 28, drum 44, plate 45, hub 56, retainer member 58, piston 61, Belleville spring 52, ring 66, bearing 69, washer 67, discs 48—55, discs 51—59 and bushing 43 are all preassembled as a subassembly and adapted to be quickly and simply assembled to the complete assembly as a unit. As shown in FIGURE 3, retainer 58 is provided with a recess 105 adapted to receive a retainer 106, the retainer 106 being bolted to housing 10 by bolts 107. Retainer 106 in recess 105, prevents rotation of member 58. Housing 10 is detachably secured to housing 109 by bolts 108 shown in FIGURE 1.

It will readily be understood that the arrangement whereby the subassembly described may be quickly and simply installed as a unit or removed as a unit facilitates use of assembly and disassembly, thereby reducing costs of production and servicing of the transmission. The clamp member 106 is easily and simply installed to retain the subassembly in its proper position in the transmission.

In operation of the arrangement shown in FIGURES 1 through 3, a positive neutral, direct drive and overdrive may be obtained. Power delivery shaft 110 may drive a manually shiftable gear box or automatic transmission capable of providing additional drive ratios and reverse as desired. Belleville spring 75 normally pivots about retainer 17 on clutch drum 13 to force pressure plate 21 into its clutch engaging position. In the event that positive neutral or no drive is desired, the forks 86 and 87 are manually actuated through a clutch pedal and shaft arrangement (not shown) to move clutch actuator sleeve 77 to the right, thus pulling the inner end of Belleville spring 75 to the right to release pressure plate 21. The fiber rollers 89 and 91 bear on the side of gear 79 during the interval in which the clutch is released and provide a rolling contact with the rotating gear. It has been found that the fiber rollers provide a long and useful life and are much less expensive than roller bearings in the present application.

Belleville spring 52 is normally effective to engage clutch discs 48—55 to establish direct drive through the planetary gearing unit. With clutch discs 48—55 engaged sun gear 28 is locked to power delivery shaft 110. With both ring gear 29 and sun gear 28 fixed for rotation with power delivery shaft 110, the planetary gearing unit is locked up in direct drive.

For overdrive operation through the planetary gearing unit, fluid pressure from pump 82 may be admitted to chamber 62 through passages 70, 71, 72 and 73 under control of suitable control valving, not shown. The control valving may be manually controlled by the vehicle operator as by means of a suitable solenoid valve to either connect chamber 62 to exhaust or admit fluid under pressure to the chamber. Movement of piston 61 to the right in response to fluid pressure will release Belleville spring 52 from pressure plate 49 and cause Belleville spring 52 to act as a lever to engage pressure plate 50 to friction discs 51—59. The Belleville spring acts as a common operating member to actuate both pressure plates 49 and 50. With discs 51—59 engaged sun gear 28 is locked against rotation and functions as a reaction member for the gear unit. Shaft 110 will rotate faster than engine shaft 11, or in overdrive.

It will be understood that in the event of pump failure or loss of fluid pressure, Belleville spring 52 will automatically engage clutch discs 48—55 to place the gear unit in direct drive. This is a considerable advantage in the event of fluid pressure loss when operating on the highway in that it is often undesirable to operate in overdrive in hilly country or where maximum acceleration is desired. Also the gear unit is protected against failure as might otherwise occur in the event it was to be operated in overdrive with low oil pressure. The tandem arrangement of the discs reduces the vertical space required and makes possible the dual function of Belleville spring 52 and the use of a single piston in the assembly. The arrangement reduces costs by utilizing interchangeable parts in both disc assemblies, the single spring 52 and single piston 61. The design of Belleville spring 75 mounted directly on retainer 17 further reduces costs by providing a simple low-cost Belleville spring mounted on the clutch housing and directly engaging the clutch. The fiber rollers 89, 91 further reduce costs as compared to using a ball bearing. The provision of the subassembly of the discs in tandem as a unit and clamp arrangement whereby the subassembly may be quickly and easily installed and removed further reduces manufacturing and service costs.

Referring to FIGURE 4 there is shown a transmission assembly similar to that of FIGURES 1 through 3 but arranged to provide either underdrive or direct drive through the planetary gearing unit.

In FIGURE 4 an engine driven power input shaft 114 drives an engine flywheel or clutch drum 116 having a retainer 117 bolted thereto by bolts 118. Clutch drum 116 is provided with flats 119 adapted to receive tangs 121 of a presser plate 120. Presser plate 120 is axially movable with respect to drum 116 and rotatable therewith and is provided with an upstanding axially extending annular boss 122.

A planetary gearing unit 123 is composed of a planet carrier 124 supporting a plurality of pinion gears 125 in mesh with a ring gear 126 and a sun gear 127. Planet carrier 124 is splined to a power delivery shaft 115 to drive the same. A drive clutch plate 128 is bolted to ring gear 126 and extends outwardly between presser 120 and clutch drum 116. A sleeve extension 129 formed integrally with sun gear 127 is provided with an upstanding flange 130 bolted to a clutch drum 131 having a plate 132 fixed thereto at the opposite side of the drum from flange 130. Drum 131 is provided with a set of friction discs 133 and a second set of discs 133′, the discs of each set being interchangeable. Discs 133 and a pressure plate 134 are axially movable on drum 131. Discs 133′ and a pressure plate 135 are likewise axially movable on drum 131, all of the discs and pressure plates being fixed to drum 131 for rotation therewith.

A clutch hub 136 splined to power delivery shaft 115 carries a series of friction discs 137 thereon, the discs being splined to hub 136 for axial motion thereon. A retainer 138 bolted to housing 112 carries a series of friction discs 139 splined thereon for axial motion with respect thereto. A downwardly depending flange 140 on retainer 138 forms a chamber 141 having a piston 142 therein, the piston having a sleeve portion 143 extending outwardly from chamber 141. A ring 144 and washer 145 are carried by sleeve 143, there being a bearing 146 between the ring and washer. A pair of pivot rings 147 and 148 fixed to drum 131 receive the outer periphery of a Belleville spring 149 therebetween, the inner periphery of spring 149 contacting ring 144. Fluid under pressure may be admitted to chamber 141 for transmission drive ratio control purposes through passages 150, 151, 152 found in retainer 138. Fluid for lubrication purposes may be admitted through passages 153, 154 and 155 found in retainer 138. A bushing 156 disposed between planet carrier 124 and clutch drum 116 rotatably supports carrier 124 and one end of shaft 115. A ball bearing 157 rotatably supports the other end of shaft 115 in housing portion 112. Drum 116 is supported on shaft 144 which extends through an oil seal 177.

Retainer ring 117 has a flange or annular lip 160 formed thereon to receive the outer edge of a Belleville spring 161. A clutch actuating sleeve 162 is provided with an upstanding flange 163 at one end thereof and a pump drive gear 164 at the other end thereof, the inner edge of Belleville spring 161 being in contact with flanges 163. A clutch release yoke is provided with arms 165 and 166 contacting the outer race 167 of a roller bearing assembly 168 carried by sleeve 162. Gear 164 meshes with a gear 169 on a pump shaft 170 of a pump 171. Belleville spring 161 drives sleeve 162 through a drive connection 172.

In operation spring 161 is normally effective to engage pressure plate 120 to clutch plate 128 to establish drive through the planetary gearing, the ring retainer 117 functioning as the reaction point for the Belleville spring. In the event that a positive neutral is desired, the forks 165 and 166 may be actuated through suitable linkage (not shown) to move sleeve 162 and the inner end of Belleville spring 161 to the right to release the main drive clutch.

Belleville spring 149 is normally effective to force pressure plate 134 to engage clutch discs 132—137, the rings 147 and 148 serving as the reaction point for the spring. In this condition of operation sun gear 127 is clutched to power delivery shaft 115 to provide direct drive through the planetary gearing unit. In order to change drive ratio, fluid pressure may be admitted to chamber 141 through passages 151, 152 and 153 to cause piston 142 to move the inner end of Belleville spring 149 to the right, thereby releasing pressure plate 134 and forcing pressure plate 135 to engage discs 133—139. Sun gear 127 will thereby be held against rotation to provide reduction drive through the planetary gearing unit.

While the embodiment in FIGURES 1 through 3 is the preferred embodiment, it will readily be understood that the embodiment in FIGURE 4 includes many of the advantages of the preferred embodiment including the use of tandem sets of friction discs, the use of a single Belleville spring effective to provide direct drive through the gear unit in the event of loss of fluid pressure and to alternately actuate both sets of discs and the single piston for controlling the Belleville spring. The housing sections 111 and 112 of FIGURE 4 and 9 and 10 of FIGURE 1 are detachably secured together by bolts 158 and 108, respectively, to facilitate assembly and disassembly of the transmissions.

We claim:

1. In a transmission of the type having a power input shaft, a power delivery shaft and a planetary gearing unit disposed between said power input shaft and power delivery shaft including a planet carrier supporting a plurality of planet pinion gears in mesh with a ring gear and a sun gear and having a drum member rotatable as a unit with said sun gear; said drum member having a first set of friction elements effective when engaged to establish one transmission drive ratio and a second set of friction elements effective when engaged to establish a second transmission drive ratio, means normally effective to engage said first set of friction elements including a Belleville spring in said drum element, and means for moving said Belleville spring to release said first set of friction elements and to engage said second set of friction elements.

2. In a transmission of the type having a power input shaft, a power delivery shaft and having a planetary gearing unit disposed between said shafts including a planet carrier supporting a plurality of planet pinions in mesh with a ring gear and a sun gear and having means for controlling the transmission drive ratio including a drum rotatable with one element of said gearing unit; a first set of friction discs disposed within said drum effective when engaged to establish one drive ratio through said transmission, a second set of friction discs arranged in axial alignment with said first set of friction discs effective when engaged to establish a second transmission drive ratio, means normally effective to engage said first set of friction discs comprising a Belleville spring pivotally supported in said drum, a piston operably connected to said Belleville spring and adapted to receive fluid pressure, said piston being movable in response to fluid pressure supplied thereto to move said Belleville spring about its pivot to release said first set of friction discs and engage said second set of friction discs.

3. In a transmission of the type having a power input shaft, a power delivery shaft and having means for transmitting torque from said input shaft to said power delivery shaft including a planetary gearing unit having a planet carrier supporting a plurality of planet pinions in mesh with a ring gear and a sun gear and having means for controlling the transmission drive ratio including a drum rotatable with one element of said gear unit; an engageable and releasable clutch in said drum effective when engaged to clutch said drum to said power delivery shaft, an engageable and releasable brake in said drum effective when engaged to brake said drum against rotation, a Belleville spring pivotally supported in said drum and normally effective to engage said clutch, a chamber having a piston therein and operably connected to said Belleville spring, said piston being movable in response to fluid pressure supplied to said chamber to move said Belleville spring to release said clutch and to engage said brake.

4. In a transmission of the type having a power input shaft, a power delivery shaft and having means for transmitting torque from said power input shaft to said power delivery shaft including a planetary gearing unit having a planet carrier supporting a plurality of planet pinions in mesh with a ring gear and a sun gear and means for controlling the transmission drive ratio including a drum fixed for rotation with said sun gear; an engageable and releasable clutch in said drum effective when engaged to establish direct drive through said gear unit, an engageable and releasable brake in said drum effective when engaged to establish a second drive ratio through said transmission, means normally effective to engage said clutch including a Belleville spring pivotally supported in said drum, a chamber within said drum adapted to be filled with and exhausted of fluid pressure, a piston within said chamber, said piston having a sleeve extending out of said chamber and operably connected to said Belleville spring, said piston being effective in response to fluid pressure supplied to said chamber to move said spring to release said clutch and engage said brake.

5. In a transmission of the type having a power input shaft, a power delivery shaft and having a planetary gearing unit adapted to operably connect said power input shaft to said power delivery shaft in one of two drive ratios and including a planet carrier supporting a plurality of pinion gears in mesh with a ring gear and a sun gear and a drum fixed for rotation with said sun gear, an engageable and releasable clutch disposed in said drum effective when engaged to connect said drum to said power delivery shaft to establish direct drive through said gear unit, an engageable and releasable brake in said drum effective when engaged to prevent rotation of said drum to establish a second transmission drive ratio, said brake including a retainer fixed against rotation and forming a chamber adapted to recieve fluid under pressure, a piston in said chamber having a sleeve portion extending out of said chamber, and a Belleville spring pivotally supported on said drum and operably connected to said piston, said Belleville spring being normally effective to engage said clutch, said piston being movable in response to fluid pressure supplied to said chamber to move said spring to release said clutch and apply said brake.

6. In a transmission of the type having a transmission housing and a power input shaft and a power delivery shaft rotatably supported in said housing and a planetary gearing unit disposed between said power input shaft and said power delivery shaft including a planet carrier supporting a plurality of planet pinion gears in mesh with a sun gear and a ring gear and a subassembly for controlling the transmission drive ratio and adapted to be assembled as a unit in said housing including a drum fixed to said sun gear; a clutch unit and a brake unit, said brake unit including a retainer adapted to be clamped to said housing and forming a chamber adapted to receive fluid pressure, said subassembly also including a Belleville spring pivotally supported in said drum and a piston in said chamber having a sleeve extending outwardly from said chamber and operably connected to said Belleville spring, said spring being normally effective to engage said clutch to establish direct drive through said gear unit, said piston being movable in response to fluid pressure supplied to said chamber to actuate said spring to release said clutch and apply said brake to establish a second transmission drive ratio.

7. In a transmission of the type having a power input shaft and a power delivery shaft and a planetary gearing unit including a planet carrier supporting a plurality of planet pinions in mesh with a ring gear and a sun gear, said gear unit having one element thereof fixed for rotation with said power delivery shaft and a second element thereof driven by said clutch plate; drive ratio control mechanism for controlling the gear unit drive ratio comprising a drum member fixed for rotation with a third element of said gear unit, an engageable and releasable clutch disposed within said drum effective when engaged to clutch said drum to said power delivery shaft to establish direct drive through said gear unit, a retainer member extending into said drum forming a chamber within said drum adapted to be supplied with fluid under pressure, a brake in said drum effective when engaged to brake said drum against rotation, a piston in said chamber having a portion extending out of said chamber, a Belleville spring pivotally supported in said drum and operably connected to said piston extension, said Belleville spring being normally effective to engage said clutch, said piston being movable in response to fluid pressure supplied to said chamber to actuate said Belleville spring to release said clutch and engage said brake.

8. In a transmission assembly of the type having a housing, a power input shaft, a power delivery shaft, a planetary gearing unit in said housing adapted to selectively connect said power delivery shaft to said power input shaft in one of two drive ratios, said planetary gearing unit having a first element driven by said power input shaft, a second element fixed for rotation with said power delivery shaft, and a third element adapted to be selectively connected to said power delivery shaft and to said said housing; an improved drive ratio control including a rotatable drum disposed within said housing and connected for rotation as a unit with said third transmission element, a first set of friction elements in said drum effective when engaged to connect said drum to said power delivery shaft, a second set of friction elements in said drum effective when engaged to connect said drum to said housing, a chamber within said housing adapted to receive fluid under pressure, a piston in said chamber, a Belleville spring in said housing pivoted to said drum intermediate said sets of friction elements, said Belleville spring being normally effective to engage one of said sets of friction elements when said chamber is exhausted of fluid under pressure, said piston extending outwardly from said chamber into operable relationship with said Belleville spring, said piston being movable in response to fluid pressure in said chamber to move said spring to disengage said first set of friction elements and to engage said second set of friction elements.

9. In a transmission assembly of the type having a housing, a power input shaft, a power delivery shaft, a planetary gearing unit in said housing adapted to selectively connect said power delivery shaft to said power input shaft in one of two drive ratios, said planetary gearing unit having a first element driven by said power input shaft, a second element fixed for rotation with said power delivery shaft, and a third element adapted to be selectively connected to said power delivery shaft and to said housing; an improved drive ratio control unit disposed within said housing, said unit including a rotatable drum disposed within said housing and supported for rotation on said power delivery shaft, said drum being connected for rotation as a unit with said third element, means operable to connect said drum to said power delivery shaft including a first set of engageable and releasable friction elements disposed within said drum, means operable to connect said drum to said housing including a second set of engageable and releasable friction elements disposed within said drum, a chamber formed by said housing and extending into said drum, a Belleville spring pivoted to said drum and normally effective to engage said first set of friction elements, a piston in said chamber having a portion thereof extending outwardly from said chamber and cooperating with said Belleville spring, said piston being movable in response to fluid pressure in said chamber to move said Belleville spring to release said first set of friction members and to engage said second set of friction members, and means in said housing for admitting fluid under pressure to said chamber.

10. In a transmission assembly of the type having a housing, a power input shaft, a power delivery shaft, a planetary gearing unit in said housing adapted to selectively connect said power delivery shaft to said power input shaft in one of two drive ratios, said planetary gearing unit having a first element driven by said power input shaft, a second element fixed for rotation with said power delivery shaft, and a third element adapted to be selectively connected to said power delivery shaft and to said housing; an improved drive ratio control unit disposed within said housing, said improved drive ratio control unit including a rotatable drum disposed for rotation within said housing, a sleeve extension connecting said drum to said third element for rotation therewith as a unit and rotatably supporting said drum on said power delivery shaft, a clutch hub disposed within said drum and fixed to said power delivery shaft for rotation therewith as a unit, engageable and releasable clutch members within said rotatable drum carried by and rotatable with said drum and clutch hub respectively, a brake hub disposed within said rotatable drum and fixed against rotation, engageable and releasable brake members carried by said drum and brake hub respectively, said brake hub forming a chamber adapted to receive fluid under pressure, a Belleville spring disposed between said brake and clutch hubs and normally effective to engage said clutch members and release said brake members when said chamber is devoid of fluid under pressure, a piston in said chamber having a portion extending outwardly from said chamber into cooperative relationship with said Belleville spring, said piston being movable in response to fluid pressure to move said Belleville spring to release said clutch members and to engage brake members, respectively.

11. In a transmission assembly of the type having a housing, a power input shaft, a power delivery shaft, a planetary gearing unit in said housing adapted to selectively connect said power input shaft to said power delivery shaft in one of two drive ratios, said planetary gearing unit having a first element driven by said power input shaft, a second element fixed for rotation with said power delivery shaft, and a third element adapted to be selectively connected to said power delivery shaft and to be held against rotation; an improved drive ratio control unit disposed within said housing including a rotatable drum disposed within said housing, a sleeve extension on said drum concentric with said power delivery shaft for connecting said third element to said drum for rotation therewith as a unit and for rotatably supporting said drum on said power delivery shaft, a clutch hub disposed within said housing and fixed to said power delivery shaft for rotation therewith, engageable and releasable clutch members carried by said drum and said clutch hub, respectively, and rotatable with said drum and clutch hub respectively, a brake hub disposed within said drum and fixed to said housing, engageable and releasable brake members carried by said drum and brake hub respectively, said brake hub forming a chamber adapted to receive fluid under pressure, a Belleville spring disposed within said drum, means carried by said drum pivotally retaining the outer periphery of said Belleville spring on said drum, a piston in said chamber having a sleeve portion concentric with said power delivery shaft extending outwardly from said chamber and into cooperating relationship with respect to the inner periphery of said Belleville spring, said Belleville spring being disposed between said clutch and brake hubs and normally effective to engage said clutch members and release said brake members when said chamber is empty of fluid under pressure, said piston being axially movable in response to fluid under pressure to pivot said spring about its pivotal connection with said drum to thereby release said clutch members and engage said brake members.

References Cited in the file of this patent
UNITED STATES PATENTS

| | | |
|---|---|---|
| 2,385,517 | Hunt | Sept. 25, 1945 |
| 2,600,520 | Spase | June 17, 1952 |
| 2,743,626 | Schjolin | May 1, 1956 |
| 2,757,766 | McCroskey et al. | Aug. 7, 1956 |
| 2,861,482 | Schjolin | Nov. 25, 1958 |
| 2,890,773 | Martindell | June 16, 1959 |
| 2,939,558 | Schjolin | June 7, 1960 |